US006654598B1

United States Patent
Son (10) Patent No.: US 6,654,598 B1
(45) Date of Patent: Nov. 25, 2003

(54) METHOD FOR SETTING UP CALL IN WIRELESS LOCAL LOOP SYSTEM

(75) Inventor: Bum Soo Son, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/552,505

(22) Filed: Apr. 19, 2000

(30) Foreign Application Priority Data

Apr. 20, 1999 (KR) ........................................ 1999-13922

(51) Int. Cl.[7] .................................................. H04M 9/00
(52) U.S. Cl. ...................... 455/401; 455/445; 455/564; 455/426; 455/554; 455/555; 379/200; 379/352; 379/399.01
(58) Field of Search ................................ 455/445, 401, 455/564, 426, 554, 555; 379/200, 352, 399.01

(56) References Cited

U.S. PATENT DOCUMENTS

| | | | | |
|---|---|---|---|---|
| 5,812,651 A | * | 9/1998 | Kaplan | ...................... 379/200 |
| 6,138,038 A | * | 10/2000 | Huotari | ...................... 455/564 |
| 6,259,905 B1 | * | 7/2001 | Berkowitz | .................. 455/401 |
| 6,304,560 B1 | * | 10/2001 | Archambaud et al. | ...... 370/324 |
| 6,424,835 B1 | * | 7/2002 | Shin | ........................... 455/445 |

* cited by examiner

Primary Examiner—William Trost
Assistant Examiner—Danh C Le
(74) Attorney, Agent, or Firm—Fleshner & Kim, LLP (57) ABSTRACT

A WLL system having personal stations, either mobile stations or telephone sets with an NIU, a base station and a switching center. For faster connectivity, a method in accordance with the present invention includes the steps of (1) if the personal station is in an off hook state, the personal station transmits an origination message to the base station and assigns a traffic channel between the personal station and the base station, (2) the personal station transmits a destination telephone number to the base station, and (3) the switching center connected to the base station connecting a call to a destination personal station according to the destination telephone number, thereby reducing a delay time in setting up a call, and thereby providing a fast communication service.

23 Claims, 4 Drawing Sheets

METHOD FOR SETTING UP CALL IN WIRELESS LOCAL LOOP SYSTEM

BACKGROUND OF THE INVENTION

1. Field of the Invention

The present invention relates to a communication system, and more particularly, to a WLL (Wireless Local Loop) system.

2. Background of the Related Art

In general, the WLL system has a wireless subscriber line between a subscriber and a base station, which can provide audio communication services, facsimile services, and data communication services. The WLL system is being developed in full scale as problems of frequency efficiency, radio channel quality, and build up cost per a subscriber are solved as the technologies developed in 1980s for semiconductor and radio communication are combined with the radio frequency technology developed in 1970s.

In comparison to a conventional wire network, the WLL system has advantages including low start up cost and time, and maintenance cost, and the WLL system can provide a variety of services, such as high communication quality, data, and an ISDN (Integrated Service Digital Network) and the like. The WLL system can be applicable when a new communication service provider intends to secure a subscriber network quickly, or the WLL system can be used as a communication infrastructure of a developing country, which has a poor wire communication network.

A basic WLL system is provided with telephone sets and an NIU (Network Interface Unit) which allows a radio communication between the telephone sets and a switchboard. A separate type WLL system and a integrate type WLL system are available in the WLL system. The separate WLL system is provided with an NIU for wire connection to a stationary telephone so that the subscriber who has the stationary telephone set connected to an existing wire network can buy, not a telephone set, but the NIU only when the subscriber subscribes to the WLL system. The integrated WLL system is provided with the telephone set and the NIU integrated in hardware basis for the convenience of the subscriber who has no stationary telephone set in subscription to the WLL system.

Figure 1:
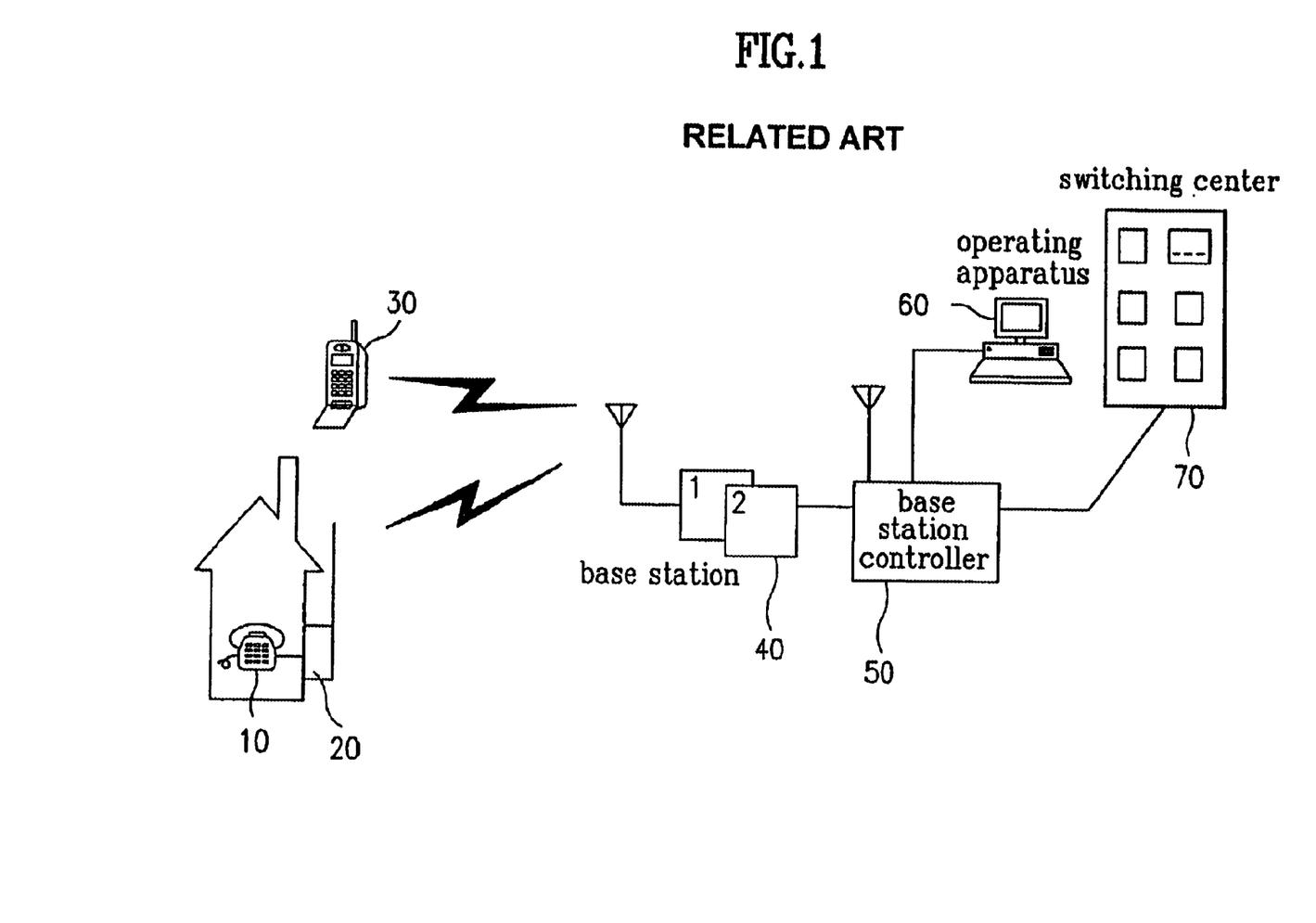
FIG. 1 illustrates related art separate type and integrate type WLL systems.

FIG. 1 illustrates related art separate type and integrate type WLL systems. The related art separate type and integrate type WLL systems are provided with a stationary telephone set 10 installed in a house or office, and an NIU 20 connected to the stationary telephone 10 for transmission/reception of information over a radio interface, an integrated type telephone set 30 having the NIU 20 built-in, respectively. A base station 40 connects to the NIU 20 or to the integrated type telephone set 30, and a base station controller 50 is wire connected to the base station 40 for processing a call and transmitting a message. An operating apparatus 60 operates and maintains the WLL system. The base station controller 50 is connected to a switching center 70.

The operation of respective units of the aforementioned WLL system will be explained. The NIU 20, connected to a last stage of the WLL system, conducts radio frequency transmission/reception functions for transmission/reception of information over a radio interface, a base band signal processing function for conducting a function for transmitting a signal converted from radio frequency into a base band to the subscriber and a function reverse of the foregoing function, a function for processing a signal protocol with a communication network, and a function for processing an audio signal. The base station 40 makes a radio connection to the NIU 20 or the integrated type telephone set 30, to processes a radio frequency signal to conduct functions of radio signal modulation/demodulation, and channel coding/decoding, and is wire connected to the base station controller 50 through a particular trunk (EI/HDSL).

The base station controller 50 is positioned between the base station 40 and the switching center 70 for controlling various base stations, and conducts a signal message transmission function, a call processing function, a code converting function, and an interfacing function between the base station and the switching center 70. The operating apparatus 60 is in charge of operation and maintenance of the NIU 20, the base station 40, and the base station controller 50, and conducts a network system managing function, network element managing function, a performance managing function, a data processing function, a software managing function, and a security managing function.

The transmission operation of the aforementioned WLL system will be explained. First, an originating side subscriber inputs a destination telephone number to the stationary telephone 10. The NIU 20 connected to the stationary telephone 10 receives the destination number, modulates it into a radio frequency, and transmits it to the base station 40. In this instance, under the present radio environment, the NIU 20 transmits the destination telephone number to the base station 40 en-bloc, or functional address signalling, wherein incoming destination telephone number is stored in a memory in succession, and the stored destination telephone number is transmitted to the base station at one time by means of an originating operation, such as pressing a "SEND" key or transmitting after a preset time is lapsed, or the like. The integrated type telephone station 30 also transmits the destination telephone number to the base station en-bloc once the destination telephone number is provided thereto.

The base station 40 transmits the destination telephone number to the switching center 70, and the switching center 70 determines the destination subscriber of being within its own area or an area of other switching center, to determine a communication path, and transmits a signal for setting up the communication path and the data to the destination subscriber, to set up a call between the origination subscriber and the destination subscriber.

The aforementioned WLL system has various problems. For example, there has been inconvenience of the additional pressing of 'SEND' button, or other originating operation required for the en-bloc transmission in the call set up after the originating subscriber presses all the destination telephone numerals. Further, the delay before completion of call set up, starting from assignment of communication channel to connection of a communication path between subscribers, coming from such a pressing of 'SEND' button or other originating operation causes a delay in a communication service.

SUMMARY OF THE INVENTION

An object of the invention is to solve at least the above problems and/or disadvantages and to provide at least the advantages described hereinafter.

An object of the present invention is to set up a call in a WLL system by using an overlap dialing during off hook of a station.

One object of the present invention is to provide a method for setting up a call in a WLL system, which can reduce a call setting up time period and solve the inconvenience of pressing "SEND" button.

To achieve these and other advantages and in accordance with the purpose of the present invention, as embodied and broadly described, the method for setting up a call in a WLL system having mobile stations, a base station and a switching center, including the steps of (1) if the mobile station is in an off hook state, the mobile station transmitting an origination message to the base station and assigning a traffic channel between the mobile station and the base station, (2) the mobile station transmitting a destination telephone number to the base station, and (3) the switching center connected to the base station connecting a call to a destination mobile station according to the destination telephone number.

In other aspect of the present invention, there is provided a method for setting up a call in a WLL system having mobile stations, a base station and a switching center, including the steps of (1) if the mobile station is in an off hook state, the mobile station detecting reception of a first digit of a destination telephone number, (2) upon detecting reception of the first digit, the mobile station transmitting an origination message to the base station and assigning a traffic channel between the mobile station and the base station, (3) the mobile station transmitting a destination telephone number to the base station, and (4) the switching center connected to the base station connecting a call to a destination mobile station according to the destination telephone number.

The step (3) includes the steps of the mobile station storing the destination telephone number received before the step (2) therein, and, upon assignment of the traffic channel, the mobile station transmitting the destination telephone number at first, and transmitting the destination telephone number received after the assignment of the traffic channel to the base station.

The destination telephone number received after the assignment of the traffic channel is transmitted one by one in real time, and the destination telephone number is transmitted from the mobile station to the base station in a burst DTMF message.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

First Embodiment

Figure 2:
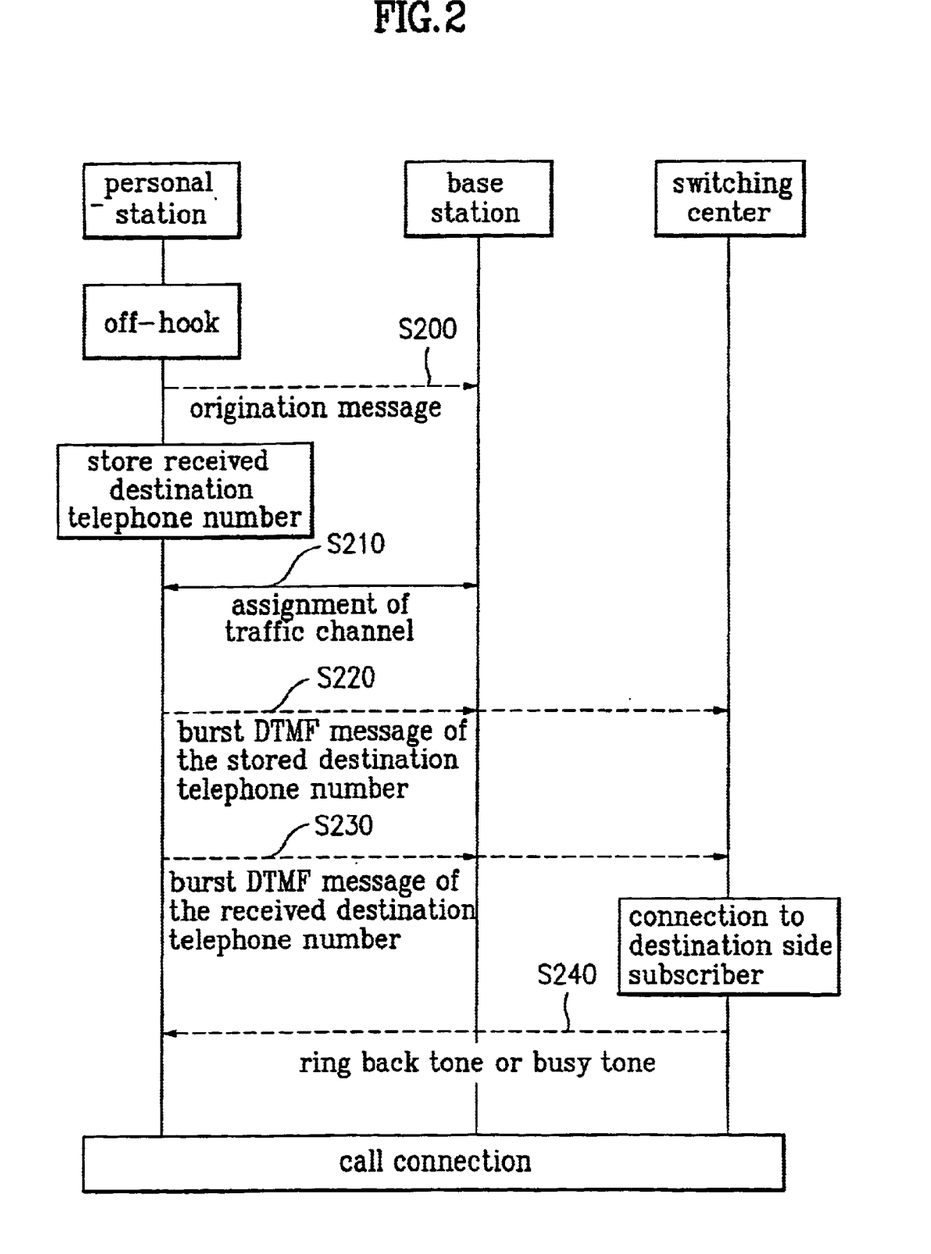
FIG. 2 illustrates a flow chart showing the steps of a method for setting up a call by using overlap dialing in accordance with a first preferred embodiment of the present invention.

FIG. 2 illustrates a flow chart showing the steps of a method for setting up a call by using overlap dialing in accordance with a first preferred embodiment of the present invention. The method for setting up a call in a WLL system can be applicable both to an integrate type mobile station having an NIU for a related art WLL system built-in therein and a separate type mobile station having an NIU radio/wire connected to a stationary telephone set.

Figure 4:
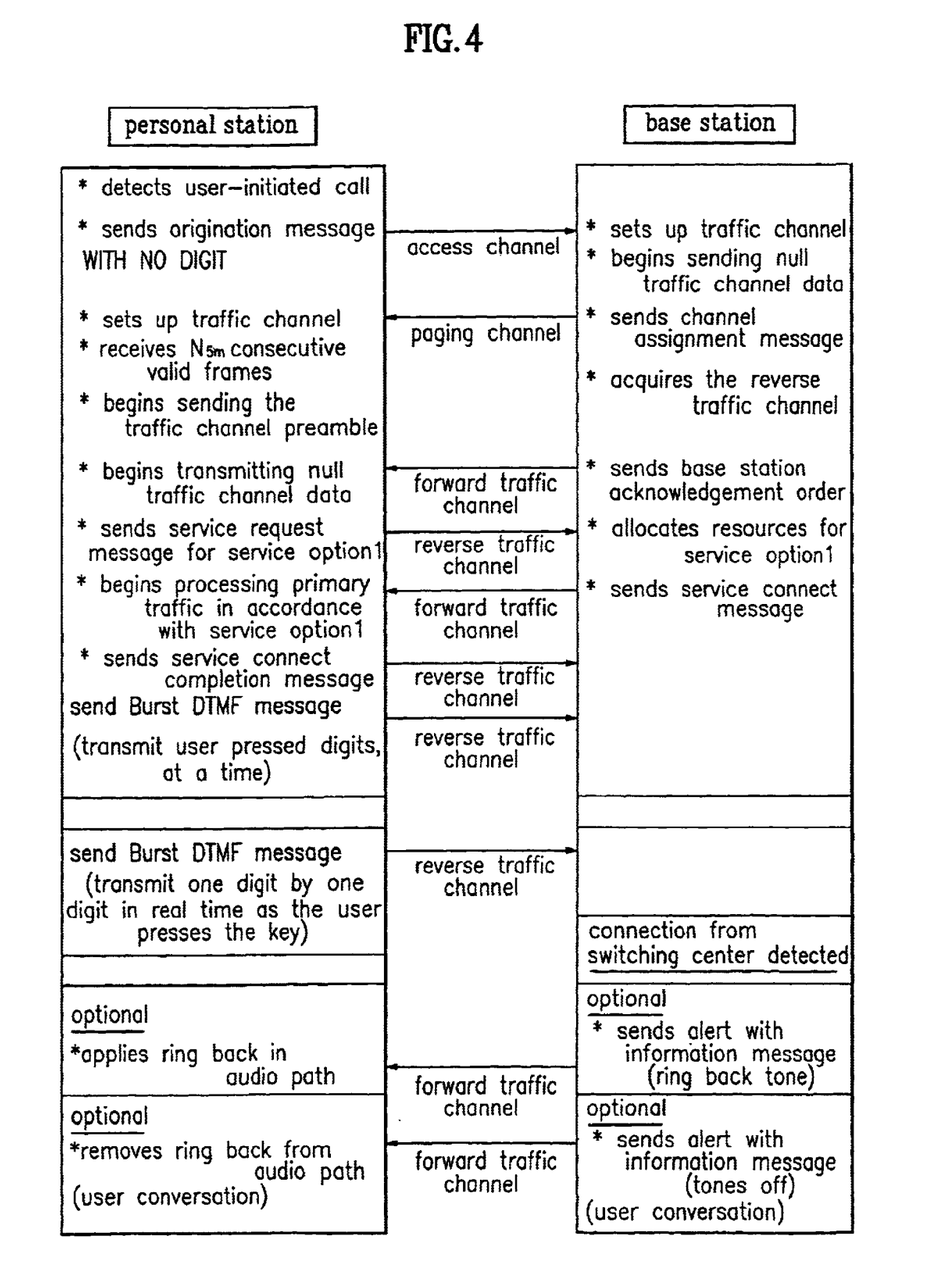

Referring to FIG. 2, the method for setting up a call in a WLL in accordance with a first preferred embodiment of the present invention starts with checking a hook state of a telephone set 10 or mobile station 30, (for convenience, collectively referred to as personal station) for detecting of an origination call. If the personal station is in an off hook state, an origination message is transmitted to the base station by using an access channel immediately, and attempt to obtain a traffic channel (S200). In this instance, the origination message contains no destination telephone number digits, and as shown in FIG. 4, a procedure for transfer of the origination message between the personal station and the base station is identical to J-STD-008 defined in the related art CDMA system.

The base station receives the origination message and assigns a communication channel (S210). In this instance, the destination telephone number that the origination side subscriber inputs before assignment of a traffic channel is stored in a memory of the mobile station. Then, when the traffic channel is assigned, the personal station transmits the destination telephone number stored in the memory to the base station in a burst DTMF message (S220), and transmits the destination telephone number received after the traffic channel is set up to the base station in real time on the same time with the input one by one in the burst DTMF message (S230).

That is, the traffic channel includes a primary having a voice or date channel, and a signaling traffic having a control channel. In the present invention, the destination telephone number is transmitted over the signaling traffic of the traffic channel.

Although the destination telephone number may be transmitted over the primary traffic, the personal station should generate a frequency tone of the DTMF through a vocoder in the personal station, encode the frequency tone of the DTMF according to a service option, and then transmit the frequency tone of the DTMF to the base station, and the base station should decode the frequency tone of the DTMF received from the personal station. Therefore, if the destination telephone number is transmitted over the primary traffic, probability of error occurrence is high. On the other hand, if the destination telephone number is transmitted over the signaling traffic, since the personal station transmits the destination telephone number in a burst DTMF message type, it is not required to encode or decode. Therefore, probability of error occurrence is low.

Upon reception of the destination telephone number, the base station transmits the destination telephone number to a switching center, and the switching center connects the call to the destination subscriber according to the destination telephone number. Then, the base station detects the call connection of the switching center, and the switching station provides a ring back tone or busy tone toward the origination personal station, to inform a call connection with the destination subscriber, thereby completing a call set up (S240).

Second Embodiment

Figure 3:
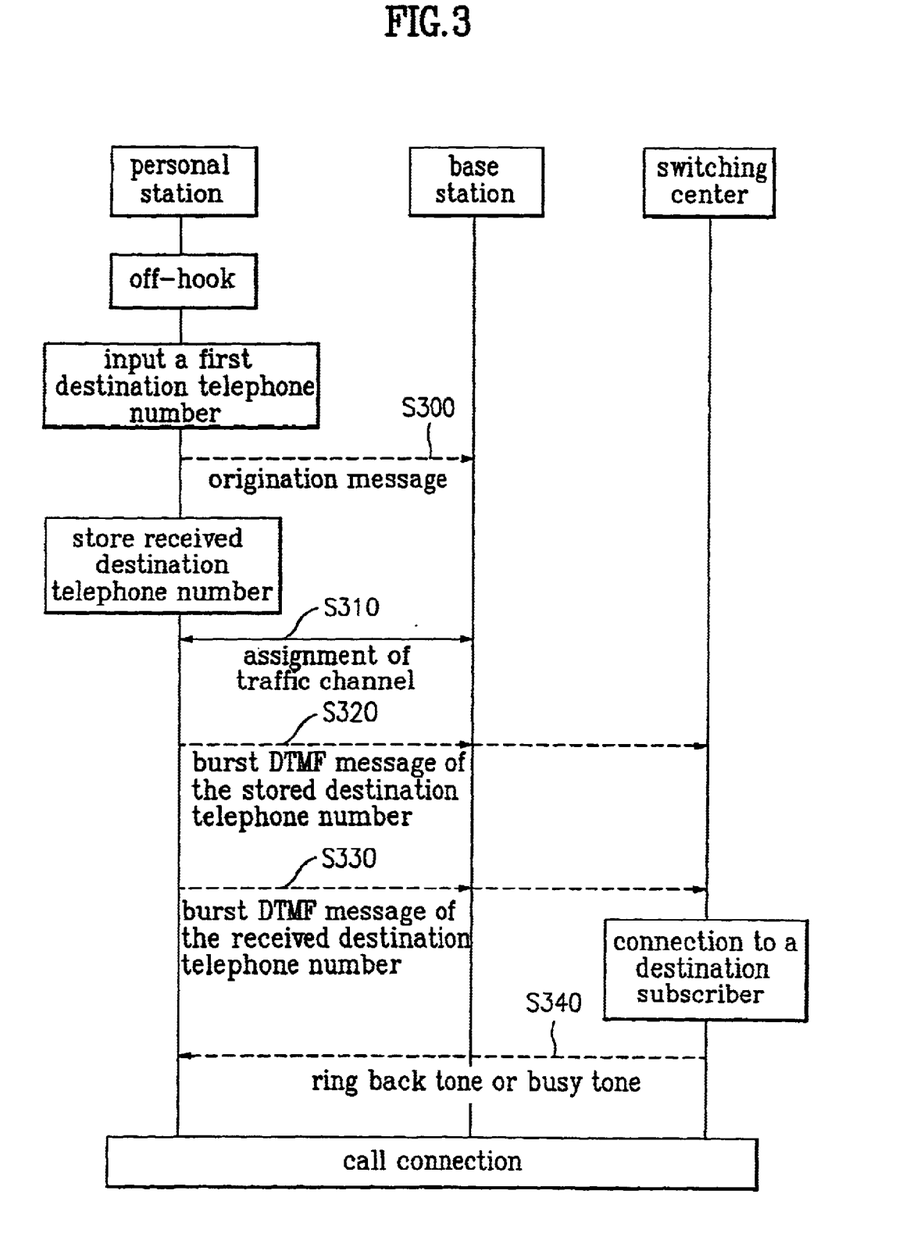
FIG. 3 illustrates a flow chart showing the steps of a method for setting up a call in accordance with a second preferred embodiment of the present invention; and, FIG. 4 illustrates a procedure for transfer of messages between a mobile station and a base station in setting up a call in accordance with a preferred embodiment of the present invention.

In the meantime, FIG. 3 illustrates a flow chart showing the steps of a method for setting up a call in accordance with a second preferred embodiment of the present invention. The method for setting up a call in accordance with a second preferred embodiment of the present invention starts with checking a hook state of the personal station, and if the personal station is in an off hook state, different from the first embodiment of the present invention, an origination message is not transmitted immediately, but input of a first digit of a destination telephone number is waited. The personal station waits for the first digit of the destination telephone number without taking any further step.

Once input of the first digit of the destination telephone number is detected, the personal station transmits the origination message to the base station, and attempts to obtain a traffic channel (S300), and the destination numbers received before assignment of the traffic channel is stored in a memory of the personal station. The method for setting up a call in accordance with the second embodiment of the present invention is the same with S210~S240 explained in connection with FIG. 2, which is the first embodiment of the present invention. Upon assignment of a traffic channel (S310), the personal station transmits the destination telephone number stored in the memory before that time to the base station in burst DTMF message (S320), and transmits the destination telephone number received after the traffic channel is set up to the base station one by one in a burst DTMF message (S330). Upon reception of all the destination telephone number through the base station, the switching center connects a call to a destination subscriber, and provides a ring back tone or busy tone to the origination personal station, to inform the call connection with the destination personal station, thereby completing a call set up (S340).

Third Embodiment

As another embodiment, though not shown in the drawing, an origination message may be transmitted, not upon detection of a first digit of a destination telephone number like the second embodiment, but upon detection of a second, a third, or a digit thereafter, of the destination telephone number.

FIG. 4 illustrates a procedure for transfer of messages between a personal station and a base station in setting up a call in accordance with a preferred embodiment of the present invention. In an off hook state of the personal station, an origination message is transmitted to a base station according to the overlap dialing defined in J-STD-008. In other words, in an off hook state, the personal station transmits an origination message to the base station through an access channel in an attempt to obtain a traffic channel, and after assignment of the traffic channel, the base station transmits a channel assignment message for the traffic channel assignment to the personal station through a paging channel. In this instance, the origination message contains no digits for the origination message.

Thereafter, the traffic channel is connected between the personal station and the base station in a service option "1", and the personal station transmits the destination telephone number to the base station by using a reverse traffic channel. In this instance, the destination telephone number the user inputs before the assignment of the traffic channel is stored in a memory of the personal station, and transmitted to the base station through a reverse traffic channel in a burst DTMF message after assignment of the traffic channel.

Further, the destination telephone number the user inputs after the assignment of the traffic channel is transmitted to the base station in real time on the same time with the input, in this time too, through the reverse traffic channel in a burst DTMF message.

The method for setting up a call in a WLL system in accordance with preferred embodiments of the present invention has various advantages. For example, the inconvenience caused by additional pressing of 'SEND' button in a WLL system is not required for the subscriber as an originating personal station generates an origination message immediately in an off hook state, is assigned of a traffic channel with a base station, and transmits a destination telephone number by using the overlap dialing. Further, similar to the subscriber using a general wire telephone, a delay time in the call set up can reduced, with a quicker communication service made available, as a communication is set up as soon as a last destination telephone number is pressed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for setting up a call in a WLL system having at least one personal station, a base station, and a switching center, comprising:

if the personal station is m an off hook state, transmitting an origination message to the base station from the personal station;

assigning a traffic channel between the personal station and the base station;

transmitting a first portion of a destination telephone number inputted at the personal station directly to the base station in real time; and connecting a call to a destination personal station according to the destination telephone number by the switching center.

2. The method as of claim 1, wherein the transmitting step includes:

storing a second portion of the destination telephone number in the personal station; and upon assignment of the traffic channel, first transmitting the second portion of the destination telephone number stored in the personal station to the base station, and transmitting a third portion of the destination telephone number received after assignment of the traffic channel to the base station.

3. The method of claim 2, wherein at least one digit included in the third portion of the destination telephone number received after the assignment of the traffic channel is transmitted one by one in real time.

4. The method of claim 1, wherein the first portion of the destination telephone number is transmitted from the personal station to the base station in a burst DTMF message.

5. The method of claim 1, further comprising:

detecting entry of digits of the destination telephone number, wherein the transmitting step includes transmitting the origination message to the base station when two or more digits of the destination telephone number are detected in the detecting step.

6. A method for setting up a call in a WLL system having at least one personal station, a base station and a switching center, the method comprising:

(1) if the personal station is in an off hook state, detecting in the personal station reception of a first digit of a destination telephone number;

(2) immediately upon detecting reception of the first digit, (2a) transmitting from the personal station an origination message to the base station and (2b) assigning a traffic channel between the personal station and the base station;

(3) transmitting from the personal station a destination telephone number to the base station; and (4) connecting a call to a destination personal station according to the destination telephone number, wherein step (3) includes:

storing in the personal station the destination telephone number received before step (2b); and upon assignment of the traffic channel, transmitting from the personal station to the base station the destination telephone number, and if all digits of the telephone number have not been entered upon assignment of the traffic channel, transmitting remaining digits of the destination telephone number received after the assignment of the traffic channel to the base station, and wherein the remaining digits of the destination telephone number received after assignment of the traffic channel are transmitted one by one in real time.

7. The method of claim 6, wherein the destination telephone number is transmitted from the mobile station to the base station in a burst DTMF message.

8. The method of claim 6, wherein step (1) includes the steps of:

detecting more than one digit of the destination telephone number; and if additional digits are detected, transmitting the origination message to the base station.

9. A method for setting up a call in a WLL system having at least one personal station, a base station and a switching center, the method comprising:

detecting a condition where the personal station is in an off hook state and a predetermined number of digits of a telephone number have been entered, said predetermined number of digits being less than all digits of the telephone number;

immediately transmitting an origination message to the base station from the personal station when said condition is satisfied;

assigning a traffic channel between the personal station and the base station;

transmitting a destination telephone number inputted at the personal station to the base station; and connecting a call to a destination personal station according to the destination telephone number, wherein the transmitting step includes:

storing digits of the destination telephone number in the personal station before the assigning step; and upon assignment of the traffic channel, transmitting the destination telephone number stored in the personal station to the base station, and if all digits of the telephone number have not been entered upon assignment of the traffic channel, transmitting remaining digits of the destination telephone number received after the assignment of the traffic channel to the base station, and wherein the remaining digits of the destination telephone number received after assignment of the traffic channel are transmitted one by one in real time.

10. The method of claim 9, wherein the destination telephone number is transmitted from the personal station to the base station in a burst DTMF message.

11. The method of clam 9, wherein the transmitting step includes:

transmitting the destination telephone number to the base station over a control channel.

12. The method of claim 9, wherein the transmitting step includes transmitting an origination message to the base station from the personal station when two or more digits of the destination telephone number are detected.

13. A method for setting up a call in a WLL system having at least one personal station, a base station, and a switching center, comprising:

if the personal station is in an off hook state, transmitting an origination message to the base station from the personal station;

assigning a traffic channel between the personal station and the base station;

if a predetermined number of digits of a destination telephone number is stored in memory, then transnmitting the stored digits of the destination telephone number inputted at the personal station to the base station;

transmitting digits of the destination telephone number directly to the base station in real time after the traffic channel is assigned; and connecting a call to a destination personal station according to the destination telephone number by the switching center.

14. The method of claim 13, wherein the digits of the destination telephone number transmitted directly to the base station in real time are transmitted in a burst DTMF message.

15. The method of claim 13, wherein said predetermined number of digits is greater than or equal to zero.

16. The method of claim 13, further comprising:

detecting entry of digits of the destination telephone number, wherein the transmitting step includes transmitting the origination message to the base station when two or more digits of the destination telephone number are detected in the detecting step.

17. A method for setting up a call in a WLL system having at least one personal station, a base station and a switching center, the method comprising:

(1) if the personal station is in an off hook state, transmitting an origination message to the base station by the personal station;

(2) storing at least one digit of a destination telephone number in the personal station;

(3) assigning a traffic channel between the personal station and the base station;

(4) transmitting the at least one stored digit of the destination telephone number to the base station;

(5) transmitting subsequent digits of the destination telephone number centered after assignment of the traffic channel directly to the base station in real time; and (6) connecting a call to a destination personal station according to the digits of the destination telephone number transmitted in steps (4) and (5).

18. The method of claim 17, wherein the digits of the destination telephone number transmitted in steps (4) and (5) are sequentially transmitted.

19. A method for setting up a call in a WLL system having at least one personal station, a base station and a switching center, comprising:

if the personal station is detected to be in an off hook state, transmitting an origination message to the base station;

assigning a traffic channel between the mobile station and the base station; and transmitting at least one digit of a destination telephone number directly to the base station in real time.

20. The method of claim 19, further comprising:

connecting a call based on said at least one digit transmitted in real time.

21. The method of claim 19, further comprising:

transmitting all digits of the destination telephone number sequentially.

22. The method of claim 19, wherein the transmitting step includes:

transmitting said at least one digit of a destination telephone number to the base station in a burst DTMF message.

23. The method of claim 19, further comprising:

detecting entry of digits of the destination telephone number, wherein the transmitting step includes transmitting the origination message to the base station when two or more digits of the destination telephone number are detected in the detecting step.

* * * * *

UNITED STATES PATENT AND TRADEMARK OFFICE
CERTIFICATE OF CORRECTION

PATENT NO. : 6,654,598 B1
DATED : November 25, 2003
INVENTOR(S) : Bum Soo Son

It is certified that error appears in the above-identified patent and that said Letters Patent is hereby corrected as shown below:

<u>Column 6,</u>
Line 36, change "m" to -- in --

Signed and Sealed this

Twenty-seventh Day of July, 2004

JON W. DUDAS
*Acting Director of the United States Patent and Trademark Office*